US012709419B2

(12) United States Patent
O'Brien et al.

(10) Patent No.: US 12,709,419 B2
(45) Date of Patent: Aug. 18, 2026

(54) HYBRID DRIVE AND FUEL VAPORIZER FOR UAV AND OTHER MOBILE ENVIRONMENTS

(71) Applicant: LiquidPiston, Inc., Bloomfield, CT (US)

(72) Inventors: Robert O'Brien, Canton, CT (US); Rodrigo Eguiluz Carretero, Manchester, CT (US); Alexander Kopache, Simsbury, CT (US); Mark Nickerson, Falmouth, ME (US); Adam Spitulnik, Hartford, CT (US); Christopher Deely, Wilmington, DE (US); Alexander Shkolnik, Wilmington, MA (US); Nikolay Shkolnik, West Hartford, CT (US); Jason Michael Deguzis, Amston, CT (US)

(73) Assignee: LiquidPiston, Inc., Bloomfield, CT (US)

( * ) Notice: Subject to any disclaimer, the term of this patent is extended or adjusted under 35 U.S.C. 154(b) by 342 days.

(21) Appl. No.: 18/018,691

(22) PCT Filed: Aug. 3, 2021

(86) PCT No.: PCT/US2021/044366
§ 371 (c)(1),
(2) Date: Jan. 30, 2023

(87) PCT Pub. No.: WO2022/066290
PCT Pub. Date: Mar. 31, 2022

(65) Prior Publication Data

US 2023/0294850 A1 Sep. 21, 2023

Related U.S. Application Data

(60) Provisional application No. 63/060,367, filed on Aug. 3, 2020.

(51) Int. Cl.
*F02M 1/16* (2006.01)
*B64D 27/33* (2024.01)
(Continued)

(52) U.S. Cl.
CPC ............ *B64U 50/19* (2023.01); *B64D 27/33* (2024.01); *B64D 31/18* (2024.01); *B64D 35/023* (2024.01); *B64U 50/11* (2023.01); *B64U 50/33* (2023.01)

(58) Field of Classification Search
CPC ........ F02M 31/18; B64U 50/19; B64U 50/11; B64U 10/17; B64U 50/33; B60L 1/00;
(Continued)

(56) References Cited

U.S. PATENT DOCUMENTS 4,375,799 A 3/1983 Swanson
4,421,079 A 12/1983 Wade
(Continued)

FOREIGN PATENT DOCUMENTS

AU 9659601 2/1997
CN 101423060 B 9/2011
(Continued)

OTHER PUBLICATIONS

International Searching Authority—International Search Report, pertaining to International Application No. PCT/US2021/044366 dated Apr. 5, 2022, together with the Written Opinion of the International Searching Authority, 12 pages.
(Continued)

*Primary Examiner* — Hung Q Nguyen
*Assistant Examiner* — James J Kim
(74) *Attorney, Agent, or Firm* — Merchant & Gould P.C.

(57) ABSTRACT

A hybrid drive having a load shaft; a motor/generator coupled to the load shaft; an internal combustion engine; an electromagnetic clutch, configured to disengageably couple
(Continued)

the internal combustion engine to the load shaft, and located between the motor/generator and the internal combustion engine; and a power supply, coupled to the motor/generator and to the clutch.

18 Claims, 5 Drawing Sheets

(51) Int. Cl.
*B64D 31/18* (2024.01)
*B64D 35/023* (2024.01)
*B64U 50/11* (2023.01)
*B64U 50/19* (2023.01)
*B64U 50/33* (2023.01)

(58) Field of Classification Search
CPC ......... B60L 1/003; B60W 10/08; F02N 11/04; F02N 15/02
USPC ....................................................... 123/179.7
See application file for complete search history.

(56) References Cited

U.S. PATENT DOCUMENTS 4,441,573 A * 4/1984 Carman ................... B60K 6/12 180/165
4,489,242 A * 12/1984 Worst ........................ B60L 1/00 123/41.46
4,533,011 A 8/1985 Heidemeyer et al.
5,755,302 A 5/1998 Lutz et al.
5,931,271 A 8/1999 Haka
6,209,672 B1 * 4/2001 Severinsky ............ B60K 6/442 180/65.23
6,251,042 B1 6/2001 Peterson et al.
6,308,794 B1 10/2001 Oppitz
7,469,778 B2 12/2008 Groddeck et al.
9,061,578 B2 6/2015 Haneda et al.
9,327,722 B1 * 5/2016 Johri ....................... F16H 61/16
9,731,709 B2 * 8/2017 Cho ................ B60W 30/18036
9,822,699 B2 * 11/2017 Yamashita .......... F02D 41/0007
10,837,304 B2 11/2020 Vondrell et al.
12,140,073 B2 * 11/2024 Pennazza ............... B60K 6/442
2002/0108373 A1 8/2002 Frey
2003/0047361 A1 3/2003 McCarthy
2004/0251758 A1 12/2004 Wilmore
2007/0095584 A1 5/2007 Roske et al.
2008/0184906 A1 8/2008 Kejha
2009/0098976 A1 4/2009 Usoro et al.
2010/0032218 A1 2/2010 Ideshio et al.
2010/0125022 A1 5/2010 Mittelberger et al.
2010/0151990 A1 6/2010 Seel
2010/0184559 A1 7/2010 Tang et al.
2011/0263370 A1 10/2011 Borntraeger et al.
2012/0010770 A1 1/2012 Beckett et al.
2012/0209456 A1 8/2012 Harmon et al.
2013/0199464 A1 8/2013 Burr
2013/0345019 A1 12/2013 Kaltenbach et al.
2014/0041483 A1 2/2014 Glassner et al.
2015/0083546 A1 3/2015 Moser et al.
2015/0203104 A1 7/2015 Haneda et al.
2015/0258881 A1 9/2015 Holmes et al.
2016/0010592 A1 * 1/2016 Wilson .................. F02M 27/02 123/590
2016/0207525 A1 7/2016 Nefcy et al.
2017/0182996 A1 6/2017 Hose
2018/0194484 A1 * 7/2018 Livieratos ............. B64U 10/13
2020/0180422 A1 6/2020 Heeke
2021/0122357 A1 4/2021 Xu et al.
2021/0162854 A1 6/2021 Lehmann et al.
2022/0080821 A1 3/2022 Etzel et al.
2022/0204171 A1 * 6/2022 Veilleux, Jr. ............ B60L 50/60

FOREIGN PATENT DOCUMENTS

CN 107816384 A 3/2018
CN 114829180 A 7/2022
CN 116529114 A 8/2023
DE 19930793 B4 7/1999
DE 19937545 A1 2/2000
DE 10204982 A1 2/2002
DE 102005024359 A1 11/2006
DE 102005024411 A1 11/2006
DE 102006060874 A1 12/2008
DE 102004044468 B4 1/2010
DE 102008053505 A1 4/2010
DE 102009002805 A1 11/2010
DE 102011113326 A1 3/2013
DE 102015116605 A1 4/2016
DE 102016100129 A1 7/2016
DE 102015206036 A1 10/2016
DE 102015214861 A1 2/2017
DE 102018103336 A1 2/2018
DE 102017200982 A1 7/2018
DE 102017211711 A1 1/2019
DE 102019102878 A1 8/2020
DE 102013012748 B4 10/2021
EP 0724978 A1 11/1995
EP 2686187 B1 2/2012
EP 2962885 A1 1/2016
FR 2962404 A1 1/2012
GB 2374844 A 10/2002
IN 200173523 A 9/2017
JP 2000-152418 A 5/2000
JP 2004-138012 A 5/2004
JP 2004-203218 A 7/2004
JP 2005-20911 A 1/2005
JP 2006-282070 A 10/2006
JP 2007-504054 A 3/2007
JP 2009-208702 A 9/2009
JP 2011-93494 A 5/2011
JP 2012-86760 A 5/2012
JP 2018-140767 A 9/2018
WO 2004/053350 A1 6/2004
WO 2005/049358 A1 6/2005
WO 2007/107458 A2 9/2007
WO 2009/053296 A1 4/2009
WO 2010/063735 A2 6/2010
WO 2017/144156 A1 8/2017
WO 2020/098873 A1 5/2020

OTHER PUBLICATIONS

European Patent Office—Extended European Search Report, pertaining to European Application No. 21873133.9 dated Aug. 12, 2024, 10 pages.

* cited by examiner 506
508
510
504
502

HYBRID DRIVE AND FUEL VAPORIZER FOR UAV AND OTHER MOBILE ENVIRONMENTS

CROSS-REFERENCE TO RELATED APPLICATIONS

This application is the national stage entry of International Application No. PCT/US2021/044366, filed Aug. 3, 2021, which claims the benefit of U.S. Provisional Application No. 63/060,367, filed Aug. 3, 2020, the disclosure of each of which is incorporated by reference herein in its entirety.

TECHNICAL FIELD

The present application relates to the field of hybrid, electro-mechanical drivetrains where battery supplied power is insufficient to provide a long endurance and, therefore, must be supplemented by energy derived from fuel in the course of combustion. An example of such drivetrains is the Aerial Vehicle, manned or unmanned, wherein the power-to-weight ratio and the specific energy are dominating factors. Furthermore, the present application also relates to the field of assistive devices to enable multi-fuel engines to start and operate efficiently.

BACKGROUND ART

Electrical motors are gaining in popularity for many mobile drives, such as unmanned aerial vehicles ("UAVs"), electric aircrafts, etc., but large and heavy batteries limit the specific energy and specific power. Hybrid drives that combine electric motors with a combustion engine are a potential solution. Novel hybrid drive configurations that enable high specific power and specific energy, as well as battery recharging during takeoff and landing, remote engine restarting, and quiet (electric motor only) operation during cruise are described herein.

SUMMARY OF THE EMBODIMENTS

In one embodiment, the invention provides a hybrid drive. The hybrid drive of this embodiment includes a load shaft; a motor/generator coupled to the load shaft; an internal combustion engine; an electromagnetic clutch, configured to disengageably couple the internal combustion engine to the load shaft, and located between the motor/generator and the internal combustion engine; and a power supply, coupled to the motor/generator and to the clutch.

The invention also provides a hybrid drive of another embodiment, wherein the embodiment includes a load shaft; a second electric motor, coupled to the load shaft; an over-running one-way clutch, coupled to the load shaft; a motor/generator, disengageably coupled to the load shaft through the over-running one-way clutch; an internal combustion engine, coupled to the load shaft and the second electric motor, so that the load shaft is driven by a source selected from the group consisting of the second electric motor, the internal combustion engine in combination with the motor/generator, and the internal combustion engine in combination with the motor/generator and the second electric motor; and a power supply, coupled to the second electric motor and the motor/generator.

In a related embodiment, the hybrid drive of these embodiments is configured so that the internal combustion engine both drives the load shaft and causes the motor/generator to recharge the power supply. Alternatively or in addition, the hybrid drive is configured so that the internal combustion engine is started by energy from the power supply delivered to the motor/generator. The power supply can include an electronic control unit configured to switch the motor/generator's mode of operation to a mode of operation selected from the group consisting of motor operation, generator operation, and combinations thereof. The hybrid drive may include at least one other electrically powered component, such as an additional electric motor. The power supply may be configured to deliver power to the at least one other electrically powered component.

In some embodiments, the motor/generator may be configured to start the engine. The motor/generator may be configured to start the engine prior to flight. The motor/generator may be configured to restart the engine during flight.

In another embodiment, there is provided an improved fuel vaporizer, of the type coupled for use with an internal combustion engine, and including a body, fuel and air inlets, an air/fuel outlet, and a heater that vaporizes the fuel, wherein the improvement is characterized in that the air inlet is disposed in a direction tangential to fuel flow so as to cause formation of an air vortex that quickly and thoroughly mixes with fuel from the fuel inlet. Optionally, the heater is operated by an arrangement selected from the group consisting of electrical means, exhaust gas, and combinations thereof. In a related embodiment, there is provided a hybrid drive, in accordance with any of the previously described embodiments, wherein the internal combustion engine is equipped with the improved fuel vaporizer of embodiments described in this paragraph.

In another embodiment, the invention provides an aircraft having a hybrid drive according to any one of the previously described embodiments, and wherein the aircraft further includes a thruster coupled to the load shaft.

In another embodiment, the invention provides a method of achieving a quiet mode of operation and during operation of an UAV using the hybrid drive of any of the previously described embodiments. In this embodiment, the method includes, in the following order:

- turning off the internal combustion engine when the quiet mode of operation is required and driving the load shaft solely with the motor/generator; and
- restarting the internal combustion engine when the quiet mode of operation is no longer required, using the motor/generator to restart the internal combustion engine.

In a related similar embodiment, utilizing an UAV having the previously described hybrid drive including a second electric motor, the invention provides a method of achieving a quiet mode of operation, and the method includes, in the following order:

- turning off the internal combustion engine when the quiet mode of operation is required and driving the load shaft solely with the second motor; and
- restarting the internal combustion engine when the quiet mode of operation is no longer required, using the motor/generator to restart the internal combustion engine.

In another embodiment, there is provided a method of achieving dash speed operation of a UAV using the first above-described hybrid drive embodiment, in which the method includes driving the load shaft with both the motor/generator and the internal combustion engine.

In another embodiment, there is provided a method of achieving dash speed operation of a UAV using the second above-described hybrid drive embodiment, in which the method includes driving the load shaft with a combination of the motor/generator, the second electric motor, and the internal combustion engine.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

An "electric motor/generator" or "motor/generator" is an electric machine that can work as an electric motor, i.e. to drive a shaft, when powered by a power supply, and which can work as an electrical generator, when powered by an engine (the generated electricity can be used to recharge the power supply).

"Power supply" means a rechargeable source of electricity, for example, batteries, supercapacitors, or other devices capable of accepting, storing, and releasing electrical energy.

"UAV" means unmanned aerial vehicle.

"VTOL" means vertical take-off and landing.

"Dash speed" means a speed that is unsustainable during normal operations but that is necessary for mission requirements, for example, high-speed cruise, which is normally not economical.

A "set" includes at least one member.

Figure 1:
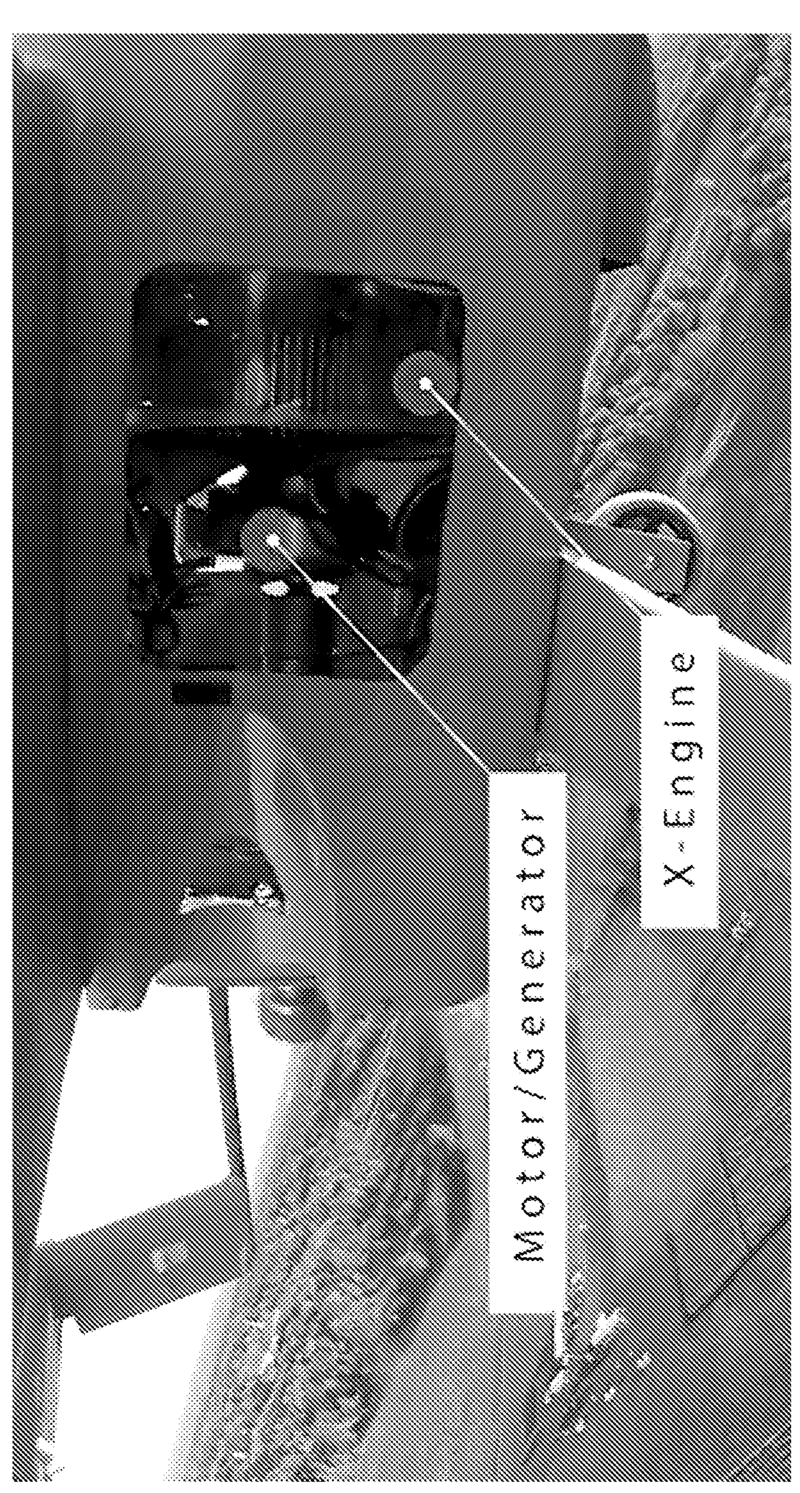
FIG. 1 shows a photograph of an engine-motor/generator hybrid, viewed from the wing of an UAV in flight, in accordance with an embodiment of the present invention.

Electric motors powered by batteries have gained popularity because they are compact, durable, and quiet. Unfortunately, battery capacity is not sufficient in many cases, and using larger batteries is not feasible because it reduces the specific energy of the system. FIG. 1 shows a hybrid drive, which was used to fly an UAV. The hybrid drive of FIG. 1, which includes an engine and a motor/generator, is augmented by a fuel vaporizer in accordance with an embodiment of the present invention. Not only does such a drive increase the system endurance, it also enables the motor/generator to be used as a generator to recharge the batteries depleted during takeoff, and to be used to start the engine before flight and/or restart the engine during flight. Such a configuration is especially valuable for vehicles that operate using VTOL.

Figure 2:
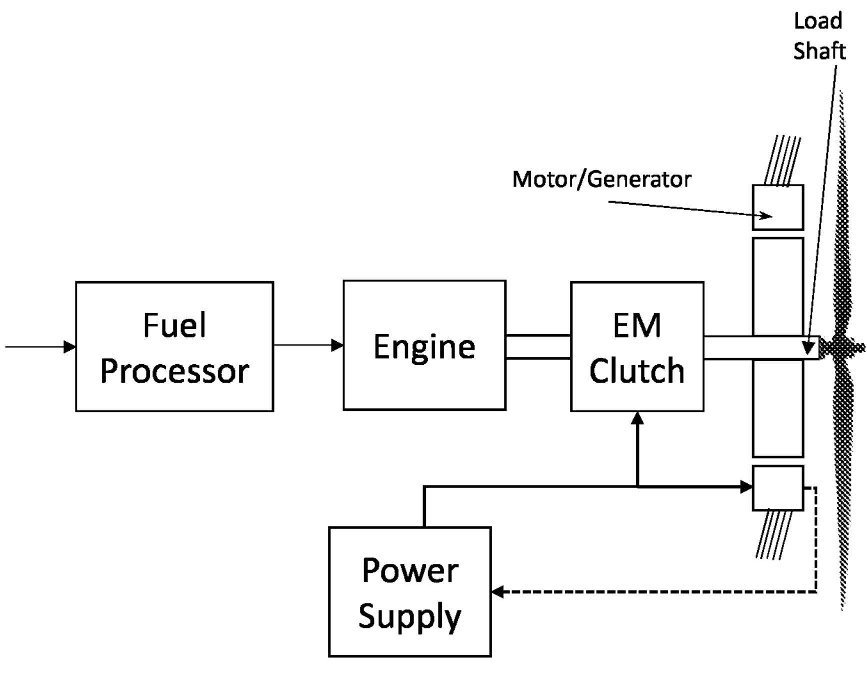
FIG. 2 shows a block-diagram of a hybrid drive utilizing an electromagnetic ("EM") clutch to decouple the engine from the motor/generator and the load shaft, in accordance with an embodiment of the present invention.

A block-diagram of the hybrid drive of FIG. 1 is shown in FIG. 2. During takeoff, or during high-load demand on the load shaft (i.e. high-speed dashing), the load shaft power is generated by the engine as well as the motor/generator, which is energized by a power supply. When the clutch is engaged, the engine is coupled to the motor/generator, and maximum power is provided to drive the load shaft. Maximum power can be provided only for a relatively short period of time and is dependent upon the capacity of the power supply. For fixed wing aircrafts under typical cruising conditions, only about 20-30% of maximum power is required and the motor/generator may be switched to operate as a generator to recharge the depleted power supply. Switching of the motor/generator's operation from motor operation to generator operation (and vice versa) is controlled by an electronic control unit ("ECU"), which is part of the power supply. When the motor/generator is in generator mode, it is driven by the engine to generate electrical power that recharges the power supply. During flight, there may be a need for a "quiet" mode of operation. During such a quiet mode of operation, the engine is shut down, the clutch is disengaged from the motor/generator, and the flight continues, wherein the motor/generator, operating as a motor, is entirely electrically powered by the power supply. After a quiet mode of operation is completed, the engine may be restarted using the motor/generator, often at high altitude and very low temperatures. Solid lines indicate power consumption from the power supply by the motor/generator and EM clutch. Dashed lines indicate power production by the motor/generator. In some embodiments, a thruster may be coupled to the load shaft.

Figure 3:
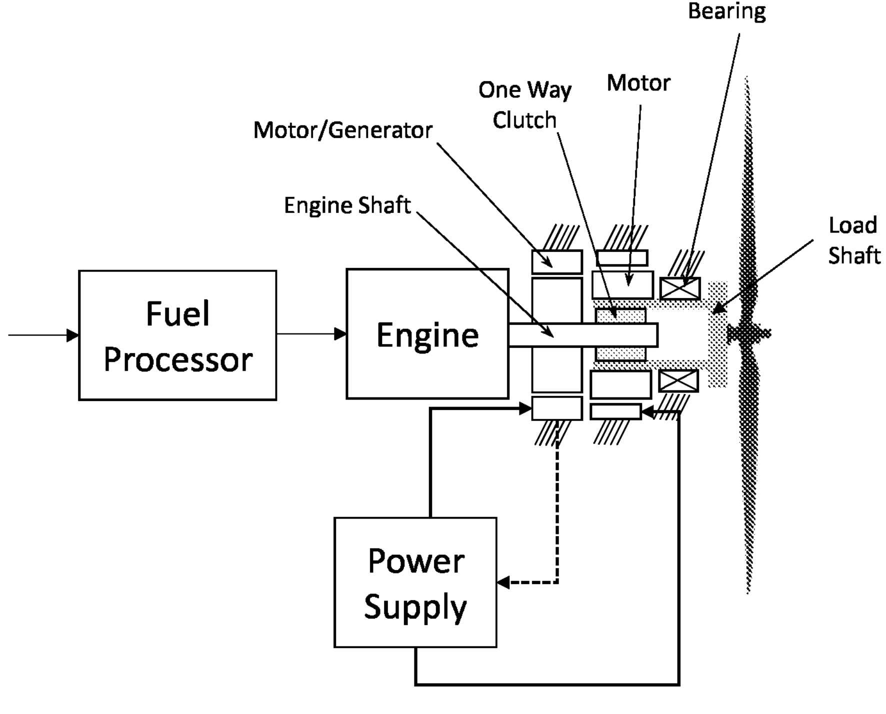
FIG. 3 shows block-diagram of a hybrid drive, wherein a one-way mechanical clutch is used to decouple the engine and rigidly attached first motor/generator from the load shaft and the rigidly attached second electric motor, in accordance with an embodiment of the present invention.

To improve the power to weight ratio of the drivetrain, an alternative hybrid drive embodiment of the present invention, shown in FIG. 3, may be used. Compared to the configuration shown in FIG. 2, the electromagnetic clutch (which is typically bulky, heavy and requires power to operate) is replaced with a combination of a second electric motor and an over-running one-way clutch. Solid lines indicate power consumption from the power supply by the motor/generator and/or motor and dashed lines indicate power production by the motor/generator. Here, the engine's shaft is rigidly coupled to the motor/generator and the engine's shaft is coupled to the load shaft via an over-running one-way clutch. The load shaft is rigidly coupled to a second electric motor (referred to as "motor" in FIG. 3). Depending upon the load shaft power requirements during the takeoff, cruise, or landing, the power to the load shaft may be delivered in one of the three ways, as detailed below.

In a first embodiment, power to the load shaft may be delivered by the engine along with the motor/generator and the second electric motor, which allows for the production of the full power necessary for takeoff and/or dash speed operation. Takeoff may be horizontal or vertical.

In a second embodiment, power to the load shaft may be delivered by the engine along with the motor/generator, i.e., without the second electric motor (the second electric motor's windings are not activated).

In a third embodiment, power to the load shaft may be delivered only by the second electric motor. Here, the engine is shut down and the windings of the motor/generator are deactivated. Powering the load shaft in this way may be useful when a quiet mode of operation of the vehicle is required.

In various embodiments, including but not limited to the first and second embodiments detailed above, the system may also deliver electrical power to the power supply, thereby recharging it, by putting the motor/generator in generator mode. When the motor/generator is in generator mode, it is driven by the engine to generate electrical power that recharges the power supply. The motor/generator's operation may be switched from motor operation to generator operation (and vice versa) by an ECU, which is part of the power supply. The power supply may also be used to deliver power to other electrically powered components, such as additional electric motors that may be needed for VTOL operation or to satisfy payload needs.

In various embodiments, the hybrid drive trains disclosed herein may be used not only in air vehicles, but also in terrain vehicles as well as in boats. In some embodiments, a thruster may be coupled to the load shaft.

In various embodiments, including but not limited to the first, second, and third embodiments detailed above, the motor/generator, being coupled to the power supply, is configured to start the engine in preparation for flight (prior to flight) and/or restart the engine during flight.

To enable an internal combustion engine to start or restart, when at a cold temperature (for example, below zero degrees Celsius), especially for a drive system that operates on heavy fuels in a spark ignition mode, the engine may be equipped with a fuel processor that converts liquid fuel into a gaseous fuel in accordance with embodiments of the present invention.

For example, to enable multi-fuel capabilities, an engine may be fed with an air/fuel mixture that, when liquid fuels are used, is obtained by evaporating the fuel in a fuel processor, e.g., a fuel vaporizer. Exemplary fuel vaporizer configurations are shown in FIGS. 5 and 6. Fuel vaporizers can improve the startability of an engine with spark ignition ("SI") running on heavy fuels such as kerosene, Jet A, JP8, or diesel fuel. Heavy fuels generally will not vaporize in an engine that is cold (for example, below zero degrees Celsius) at the low compression ratios of a typical SI engine. Higher compression ratios are not possible in SI configurations due to detonation and knock once the engine starts, because heavy fuel remains liquid and an acceptable mixture of air and fuel is not available at the spark plug/ignition source. (Although we provided zero degrees Celsius as a reference temperature indicating a "cold" engine, the actual temperature at which an SI-based engine is considered "cold," so as to constitute a candidate for use of a fuel vaporizer, depends on a wide range of factors, including, but not limited to, size of the engine, thermal mass of the engine, outside temperature, as well as the engine's geometry, RPM, and compression ratio.) The use of controlled and rapid evaporation of the fuel, in combination with an air stream, improves the quality of the air/fuel mixture at the spark plug, enabling faster starting, more reliable starting, and lower emissions during cold conditions. Furthermore, the vaporizer can be used not only for starting of the engine, but at all times of engine operation.

Figures 4A, 4B:
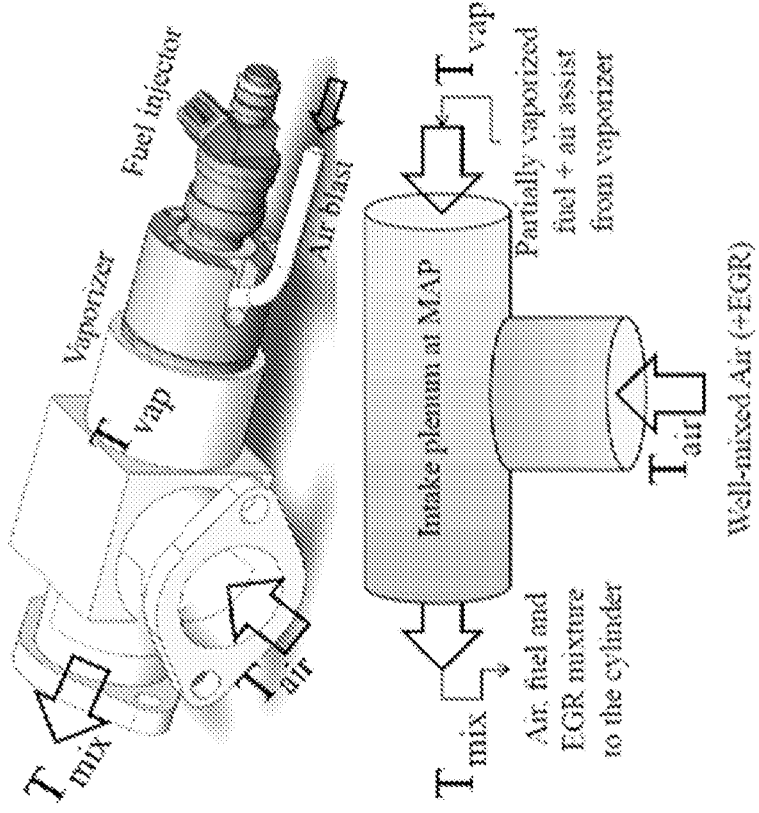
FIGS. 4A and 4B show a vaporizer as described in the prior art (see Hosseini, Vahid & Neill, William & Thomson, K. & Chippior, Wallace "Effect of initial and operating conditions on soot emissions from an HCCI engine" *Proceedings of the Combustion Institute Canadian Section Spring Technical Meeting* (2009) available on Jul. 31, 2020 at https://www.researchgate.net/publication/44094150_Effect_of_initial_and_operating_conditi ons_on_soot_emissions_from_an_HCCI_engine).

In vaporizers described in the prior art, such as the vaporizer shown in FIGS. 4A and 4B, engines required minutes, rather than seconds, to start, a duration which is unacceptably long for many applications. In some embodiments of the present invention, fuel vaporizers operating at 12 v/24 v DC power, have been tested and shown to start an engine (26 cc/chamber spark ignited Jet Fuel LPI engine, cold-soaked for 24 hours at −25° C.) within seconds.

Figures 5A, 5B:
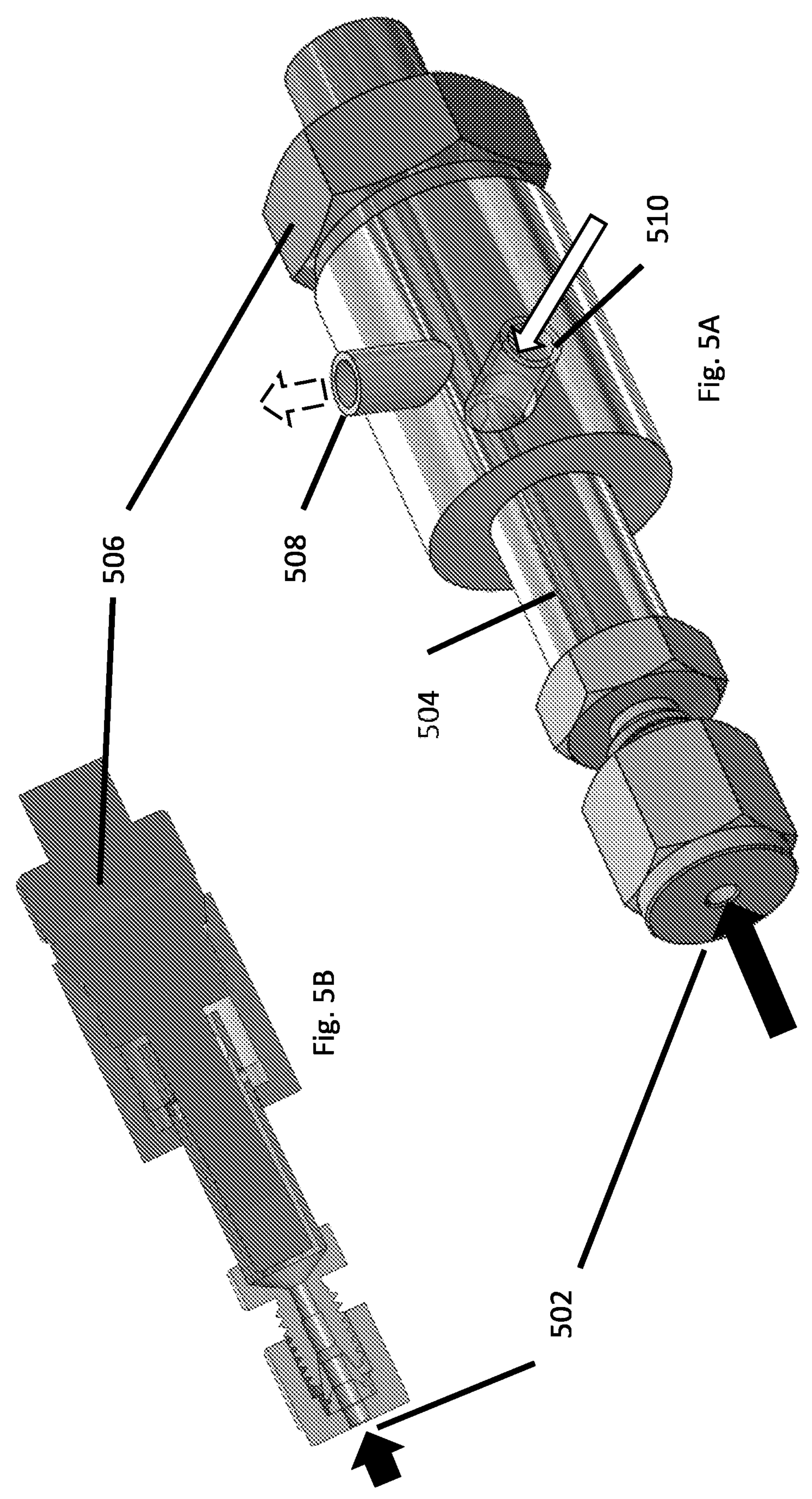
FIG. 5 shows a fuel processor (fuel vaporizer) with very rapid vaporization characteristics due to the tangential delivery of the air in relation to the fuel flow, which results in the formation of an air-fuel mixture, in accordance with an embodiment of the present invention. Such a fuel processor is very compact and avoids the needs for compressed air. Arrows with dark fill indicate fuel, arrow with no fill and solid outline indicates air, and arrow with no fill and dashed outline indicates an air/fuel mixture.
Figure 6:
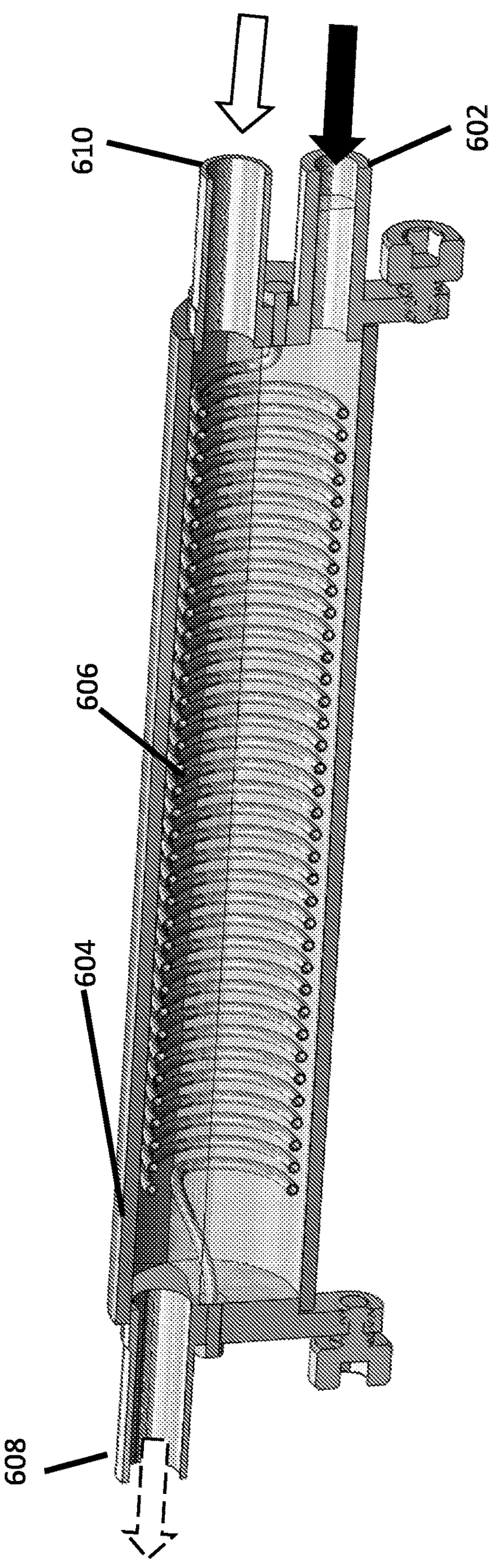
FIG. 6 shows a variation of a fuel processor (fuel vaporizer) wherein the heating of the fuel is accomplished by exhaust gas instead of, or in addition to, electrical resistive heating, in accordance with an embodiment of the present invention. The arrow with dark fill indicates fuel, the arrow with no fill and solid outline indicates air, and the arrow with no fill and dashed outline indicates an air/fuel mixture.

Referring to FIGS. 5A and 5B, in an embodiment of the present invention, fuel (represented by arrows with dark fill) is fed into fuel inlet 502 of the fuel vaporizer from a metering device (not shown) and is heated by a suitable heat source, such as a glow plug (506 of FIGS. 5A and 5B) or an electrical spiral (606 of FIG. 6), in the annulus between the heating element and the casing until it evaporates. Air inlet 510 supplies fresh air (represented by arrow with no fill and solid outline) in a tangential direction, in relation to the direction of flow of fuel, in such a manner as to create a vortex of air. Such a configuration achieves rapid vaporization of fuel and superior air/fuel vapor mixing because the vortex carries fuel to the working chamber of an engine through air/vaporized fuel outlet 508. Furthermore, we have determined that the suction produced by a rotor or piston of an engine is sufficient to produce sufficient evaporation and mixing of fuel with air only when a vortex is formed downstream from the fuel inlet, thus eliminating the need to pressurize the air. Air flow is generated in part, or entirely, by air induction into the engine's working chamber. Fuel vaporizers described herein may complement a conventional fuel system and may be used to aid cold starting of an engine. In some embodiments, the fuel vaporizer may be operational only during a period before, during, or slightly after the starting of the engine. In some embodiments, an electronic control system may switch the fuel source from the fuel vaporizer to the main fuel system when the engine is fully started and operational. A set of thermocouples or other temperature sensing devices, located on or within the evaporator body 504 is used for feedback into the controller. A valve may optionally be installed at the fuel inlet, and another valve may optionally be installed at the air inlet. In other embodiments, a fuel vaporizer may be used as the sole source of the fuel/air mixture to an engine, rather than as an intermittent source.

Fuel vaporizer heating may be achieved in various ways. In some embodiments, the glow plug shown in FIG. 5 may be replaced with a heater wire that is wound into a helix and placed inside heat conductive body 504 that will be in contact with a fuel. Heating may be achieved electrically, similar to the glow plug configuration shown in FIG. 5. In other embodiments, electrical heating may be supplemented by flowing hot exhaust gases through the fuel vaporizer to reduce electrical energy consumption. In some embodiments, startup of a fuel vaporizer may be achieved by electrical means. In some embodiments, for example, when temperature of exhaust gasses is sufficient to evaporate fuel, heating of the fuel vaporizer may be achieved entirely through the use of exhaust gases.

In some embodiments, the tube within the fuel vaporizer that is in contact with the fuel may be coated with a catalytic substance to lower the energy requirements of the vaporizer.

FIG. 6, shows an alternative embodiment of a fuel vaporizer. Fuel (represented by the arrow with dark fill) entering fuel inlet 602 fills a portion of the heat insulating body 604, leaving the space for the fuel to evaporate and, optionally, to mix with incoming fresh air (represented by arrow with no fill and solid outline) from air inlet 610 prior to its exit from air/fuel outlet 608. In some embodiments it is desirable not only to evaporate the fuel but also to superheat the fuel, in which case it can be injected into the engine at higher pressures. In some embodiments, a fuel vaporizer heating element, such as spiral heating element 606, is heated electrically). Other embodiments use exhaust gas to heat the fuel (e.g., through heating of the entire fuel vaporizer or using additional heating pipes configured to circulate exhaust gases therethrough or using combinations thereof. Care must be taken to monitor carefully the temperature of heating element 606 and/or the air/fuel mixture so that the vaporized fuel does not coke within the fuel vaporizer and the air/fuel mixture formed in the vaporizer does not spontaneously combust In some embodiments, fuel vaporizers that do not require pressurized air may be used with spark ignition engines, Reactive Control Compression Ignition engines, and Homogeneous Charge Compression Ignition engines, for example. In some embodiments, fresh air may be pressurized to pressures above those in the engine's working chambers so that the fuel vaporizer may be used with compression ignition ("CI") engines.

Combinations of the fuel vaporizer embodiments disclosed above may be used in a single device to achieve fuel vaporization and mixing.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A hybrid drive comprising:

a load shaft;

a motor/generator coupled to the load shaft;

an internal combustion engine;

an electromagnetic clutch, configured to disengagably couple the internal combustion engine to the load shaft, and located between the motor/generator and the internal combustion engine; and a power supply, coupled to the motor/generator and to the electromagnetic clutch; and a fuel vaporizer configured to provide a combustible air/fuel mixture to the internal combustion engine, the fuel vaporizer including a body, a fuel inlet, an air inlet, an air/fuel outlet, and a heater that rapidly vaporizes the fuel, wherein the air inlet is disposed downstream of the fuel inlet at a location wherein the fuel has been rapidly vaporized by the heater so that air flows from the air inlet in a direction tangential to flow of the vaporized fuel so as to cause formation of an air vortex that mixes with the vaporized fuel from the fuel inlet thereby forming the combustible air/fuel mixture.

2. A hybrid drive, according to claim 1, configured so that the internal combustion engine both drives the load shaft and causes the motor/generator to recharge the power supply.

3. A hybrid drive, according to claim 1, configured so that the internal combustion engine is started by energy from the power supply delivered to the motor/generator.

4. An aircraft having a hybrid drive according to claim 1, further comprising a thruster coupled to the load shaft.

5. A method of achieving a quiet mode of operation of a UAV using the hybrid drive of claim 1, the method comprising, in the following order:

(1) turning off the internal combustion engine when the quiet mode of operation is required and driving the load shaft solely with the motor/generator; and (2) restarting the internal combustion engine when the quiet mode of operation is no longer required, using the motor/generator to restart the internal combustion engine.

6. A method of achieving a dash speed operation of an UAV using the hybrid drive of claim 1, the method including driving the load shaft with both the motor/generator and the internal combustion engine.

7. A hybrid drive, according to claim 1, wherein the power supply includes an electronic control unit configured to switch the motor/generator's mode of operation to a mode of operation selected from the group consisting of motor operation, generator operation, and combinations thereof.

8. A hybrid drive according to claim 1, wherein the heater is operated by an arrangement selected from the group consisting of electrical means, exhaust gas, and combinations thereof.

9. A hybrid drive comprising:

a load shaft;

an electric motor, coupled to the load shaft;

an over-running one-way clutch, coupled to the load shaft;

a motor/generator, disengageably coupled to the load shaft through the over-running one-way clutch;

an internal combustion engine having an engine output shaft, the engine output shaft coupled to the load shaft and the electric motor, so that the load shaft is driven by a source selected from the group consisting of the electric motor, the internal combustion engine in combination with the motor/generator, and the internal combustion engine in combination with the motor/generator and the electric motor; a power supply, coupled to the electric motor and the motor/generator;

wherein the load shaft, and the clutch, and the engine output shaft are co-axially aligned; and a fuel vaporizer configured to provide a combustible/fuel mixture to the internal combustion engine, the fuel vaporizer including a body, a fuel inlet an air inlet, an air/fuel outlet, and a heater that rapidly vaporizes the fuel, wherein the air inlet is disposed downstream of the fuel inlet at a location wherein the fuel has been rapidly vaporized by the heater so that air flows from the air inlet in a direction tangential to flow of the vaporized fuel so as to cause formation of an air vortex that mixes with the vaporized fuel from the fuel inlet thereby forming the combustible air/fuel mixture.

10. A hybrid drive, according to claim 9, configured so that the internal combustion engine both drives the load shaft and causes the motor/generator to recharge the power supply.

11. A hybrid drive, according to claim 9, configured so that the internal combustion engine is started by energy from the power supply delivered to the motor/generator.

12. A hybrid drive according to claim 9, wherein the heater is operated by an arrangement selected from the group consisting of electrical means, exhaust gas, and combinations thereof.

13. An aircraft having a hybrid drive according to claim 9, further comprising a thruster coupled to the load shaft.

14. A method of achieving a quiet mode of operation of a UAV using the hybrid drive of claim 9, the method comprising, in the following order:

(1) turning off the internal combustion engine when the quiet mode of operation is required and driving the load shaft solely with the electric motor; and (2) restarting the internal combustion engine when the quiet mode of operation is no longer required, using the motor/generator to restart the internal combustion engine.

15. A method of achieving a dash speed operation of an UAV using the hybrid drive of claim 9, the method including driving the load shaft with a combination of the motor/generator, the electric motor, and the internal combustion engine.

16. A hybrid drive, according to claim 9, wherein the power supply includes an electronic control unit configured to switch the motor/generator's mode of operation to a mode of operation selected from the group consisting of motor operation, generator operation, and combinations thereof.

17. A fuel vaporizer, of the type coupled for use with an internal combustion engine, and including a body, a fuel inlet, an air inlet, an air/fuel outlet, and a heater that rapidly vaporizes the fuel, wherein the air inlet is disposed downstream of the fuel inlet at a location wherein the fuel has been rapidly vaporized by the heater so that air flows from the air inlet in a direction tangential to flow of the vaporized fuel so as to cause formation of an air vortex that mixes with the vaporized fuel from the fuel inlet thereby forming an air/fuel mixture.

18. The fuel vaporizer according to claim 17, wherein the heater is operated by an arrangement selected from the group consisting of electrical means, exhaust gas, and combinations thereof.

* * * * *